US011924618B2

(12) United States Patent
Nongpiur et al.

(10) Patent No.: US 11,924,618 B2
(45) Date of Patent: Mar. 5, 2024

(54) AURALIZATION FOR MULTI-MICROPHONE DEVICES

(71) Applicant: Google LLC, Mountain View, CA (US)

(72) Inventors: Rajeev Conrad Nongpiur, Palo Alto, CA (US); Ananya Misra, Mountain View, CA (US); Chanwoo Kim, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/959,734

(22) Filed: Oct. 4, 2022

(65) Prior Publication Data

US 2023/0027458 A1 Jan. 26, 2023

Related U.S. Application Data

(63) Continuation of application No. 16/555,118, filed on Aug. 29, 2019, now Pat. No. 11,470,419, which is a (Continued)

(51) Int. Cl.

| | |
|---|---|
| ***H04R 3/00*** | (2006.01) |
| ***H04R 5/027*** | (2006.01) |
| ***H04R 29/00*** | (2006.01) |

(52) U.S. Cl.

CPC ............ *H04R 3/005* (2013.01); *H04R 5/027* (2013.01); *H04R 29/005* (2013.01);

(Continued)

(58) Field of Classification Search

CPC ...... H04R 3/005; H04R 5/027; H04R 29/005; H04R 29/006; H04R 2201/401; H04R 2430/20

(Continued)

(56) References Cited

U.S. PATENT DOCUMENTS

| | | | |
|---|---|---|---|
| 5,473,759 | A | 12/1995 | Slaney et al. |
| 6,366,679 | B1 | 4/2002 | Steffen et al. |

(Continued)

FOREIGN PATENT DOCUMENTS

| | | |
|---|---|---|
| EP | 2362238 | 8/2011 |
| WO | WO 2002052895 | 7/2002 |

OTHER PUBLICATIONS

Brandstein et al., "A Robust Method for Speech Signal Time-Delay Estimation in Reverberant Rooms", in Proceedings of the International Conference on Acoustics, Speech and Processing, Munich, Germany, Apr. 21-24, 1997, pp. 1-4.

(Continued)

*Primary Examiner* — Disler Paul

(74) *Attorney, Agent, or Firm* — Kilpatrick Townsend & Stockton LLP

(57) ABSTRACT

A method for auralizing a multi-microphone device. Path information for one or more sound paths using dimensions and room reflection coefficients of a simulated room for one of a plurality of microphones included in a multi-microphone device is determined. An array-related transfer functions (ARTFs) for the one of the plurality of microphones is retrieved. The auralized impulse response for the one of the plurality of microphones is generated based at least on the retrieved ARTFs and the determined path information.

18 Claims, 8 Drawing Sheets

Related U.S. Application Data continuation of application No. 15/996,070, filed on Jun. 1, 2018, now Pat. No. 10,412,489, which is a continuation of application No. 15/170,924, filed on Jun. 1, 2016, now Pat. No. 9,992,570.

(52) U.S. Cl.
CPC ...... *H04R 29/006* (2013.01); *H04R 2201/401* (2013.01); *H04R 2430/20* (2013.01)

(58) Field of Classification Search
USPC ...................................................... 381/91–92
See application file for complete search history.

(56) References Cited

U.S. PATENT DOCUMENTS

| | | | |
|---|---|---|---|
| 7,287,014 | B2 | 10/2007 | Chen et al. |
| 7,783,054 | B2 | 8/2010 | Ringlstetter et al. |
| 7,805,286 | B2 | 9/2010 | Jorgensen et al. |
| 8,527,276 | B1 | 9/2013 | Senior et al. |
| 8,964,996 | B2 | 2/2015 | Klippel et al. |
| 9,177,550 | B2 | 11/2015 | Yu et al. |
| 9,269,045 | B2 | 2/2016 | Krishnan et al. |
| 9,591,404 | B1 | 3/2017 | Chhetri |
| 9,602,923 | B2 * | 3/2017 | Florencio ................. H04R 3/02 |
| 9,674,633 | B2 * | 6/2017 | Crutchfield ........... G06F 3/0482 |
| 9,704,509 | B2 * | 7/2017 | Konjeti ................... G10L 25/84 |
| 9,813,810 | B1 | 11/2017 | Nongpiur |
| 2006/0171547 | A1 | 8/2006 | Lokki et al. |
| 2013/0096922 | A1 | 4/2013 | Asaei et al. |
| 2014/0142929 | A1 | 5/2014 | Seide et al. |
| 2014/0278396 | A1 * | 9/2014 | Graumann .......... G10L 21/0364 704/233 |
| 2016/0109284 | A1 | 4/2016 | Hammershoi et al. |
| 2017/0303039 | A1 | 10/2017 | Iyer et al. |

OTHER PUBLICATIONS

DiBiase et al., "Robust Localization in Reverberant Rooms", in Microphone Arrays: Techniques and Applications, Springer, 2001, pp. 157-180.
Notice of Allowance dated Apr. 25, 2019 in U.S. Appl. No. 15/996,070.
Notice of Allowance dated Jun. 3, 2022 in U.S. Appl. No. 16/555,118.
Notice of Allowance dated Oct. 4, 2017 in U.S. Appl. No. 15/170,924.
Office Action dated Mar. 16, 2022 in U.S. Appl. No. 16/555,118.
Office Action dated Mar. 28, 2019 in U.S. Appl. No. 15/996,070.
Office Action dated Mar. 31, 2017 in U.S. Appl. No. 15/170,924.
Office Action dated Jun. 14, 2021 in U.S. Appl. No. 16/555,118.
Office Action dated Oct. 8, 2021 in U.S. Appl. No. 16/555,118.
Office Action dated Nov. 30, 2018 in U.S. Appl. No. 15/996,070.
Savioja et al. "Creating Interactive Virtual Acoustic Environments", Audio Engineering Society, 1999, pp. 675-706.
Torres et al., "HRTF Modeling for Efficient Auralization", in Proceedings of the International Symposium on Industrial Electronics, Rio de Janeiro, Brazil, Jun. 9-11, 2003, pp. 1-5.

* cited by examiner

AURALIZATION FOR MULTI-MICROPHONE DEVICES

CROSS-REFERENCE TO RELATED APPLICATIONS

This application is a continuation of U.S. patent application Ser. No. 16/555,118, filed Aug. 29, 2019, which is a continuation of U.S. patent application Ser. No. 15/996,070, filed Jun. 1, 2018, which is a continuation of U.S. patent application Ser. No. 15/170,924, filed Jun. 1, 2016, each of which is incorporated by reference herein in its entirety.

BACKGROUND

Various signal processing techniques have been developed for estimating the location of a sound source by using multiple microphones. Such techniques typically assume that the microphones are located in free space with a relatively simple geometric arrangement, such as a linear array or a circular array, which makes it relatively easy to analyze detected sound waves. However, in some situations, microphones may not be arranged in a linear or circular array. For example, microphones may be randomly positioned at various locations across a device of an arbitrary shape in a given environment instead of being positioned in a linear or circular array. Sound waves may be diffracted and scattered across the device before they are detected by the microphones. Scattering effects, reverberations, and other linear and nonlinear effects across an arbitrarily shaped device may complicate the analysis involved in estimating the location of a sound source.

In multi-microphone devices the geometry/shape of the device is important. If the shape of the device changes, for example to move the placement of the microphones, the operation of the device, particularly the accuracy, of the device may be greatly affected. To address changes in the device shape, the device must be recorded in multiple size and shape rooms using the new design. As such, all previous recordings done for the device using the previous shape may be thrown away, which may result in a waste of resources.

BRIEF SUMMARY

According to an embodiment of the disclosed subject matter, a method is disclosed for auralizing a multi-microphone device. Path information is determined for one or more sound paths using dimensions and room reflection coefficients of a simulated room for one of a plurality of microphones included in a multi-microphone device. An array-related transfer function (ARTF) for the one of the plurality of microphones is retrieved. The auralized impulse response for the one of the plurality of microphones is generated based at least on the retrieved ARTF and the determined path information.

In an aspect of the embodiment, generating the auralized impulse response comprises extracting from the retrieved ARTFs, an ARTF corresponding to each of the one or more sound paths, determining an auralized path to the one of the plurality of microphones for each of the sound paths, and combining the auralized paths for the one of the plurality of microphones to generate the auralized impulse response of the one of the plurality of microphones.

In an aspect of the embodiment, determining the path information for the one or more sound paths comprises determining an n th shortest sound path to the one of the plurality of microphones, wherein n is a counter that is used to determine the number of sound paths that have been determined, computing the path information for the determined n th shortest sound path, and incrementing the counter by one if n is less than a threshold number of determined sound paths.

In an aspect of the embodiment, determining the auralized path to the one of the plurality of microphones for each of the sound paths comprises convolving each ARTF corresponding to the one or more sound paths with a room impulse response for respective one or more sound paths for the one of the plurality of microphones, wherein the room impulse response is calculated based on the path information of the respective one or more sound.

In an aspect of the embodiment, the path information includes a path-distance, signal attenuation, and array-direction of arrival (DOA).

In an aspect of the embodiment, the method comprises retrieving a microphone transfer function for the one of the plurality of microphones, and convolving the microphone transfer function with the determined auralized path for the one of the plurality of microphones.

In an aspect of the embodiment, the method comprises retrieving a near-microphone sound from a sound database including a plurality of near-microphone recorded speeches and sounds, and convolving the near-microphone sound with the determined auralized path for the one of the plurality of microphones to generate the auralized impulse response for the one of the plurality of microphones.

In an aspect of the embodiment, the method comprises generating an auralized impulse response for each of the plurality of microphones included in the multi-microphone device.

In an aspect of the embodiment, the method comprises modifying the microphone transfer function.

In an aspect of the embodiment, the method comprises modifying the dimensions and the room reflection coefficients of the simulated room, and generating the auralized impulse response for each of the plurality of microphones included in the multi-microphone device based on the modified dimensions and room reflection coefficients of the simulated room.

According to an embodiment of the disclosed subject matter, a system for auralizing a multi-microphone device comprises a room simulator, including a processor, the room simulator configured to determine path information for one or more sound paths using dimensions and room reflection coefficients of a simulated room for one of a plurality of microphones included in the multi-microphone device, an array-related transfer functions (ARTFs) database including a ARTFs for the one of the plurality of microphones, and an auralizer, including a processor. The auralizer is configured to retrieve the ARTFs for the one of the plurality of microphones, and generate an auralized impulse response for the one of the plurality of microphones based at least on the retrieved ARTFs and the determined path information.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
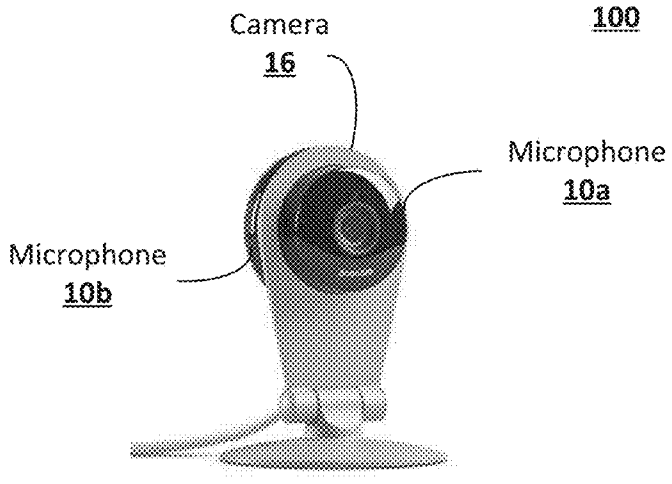
FIG. 1 shows an example of two microphones in an arbitrarily shaped device according to embodiments of the disclosed subject matter.

According to embodiments of this disclosure, methods and apparatus are provided for auralizing a multi-microphone device. In the foregoing description, multiple microphones may be collectively referred to as an "array" of microphones. An array of microphones may include microphones placed in various locations on an arbitrarily shaped device in an indoor environment such as a smart-home environment, or in another type of enclosed environment. Sound waves may experience scattering effects, diffractions, reverberations, or other linear or nonlinear effects before they are detected by the microphones. According to embodiments of the disclosure, a sound detection system includes a neural network that is trained to estimate the location of a sound source in a three-dimensional space in a given environment based on sound signals detected by multiple microphones without being dependent on conventional schemes for determining the source of a sound, where these conventional schemes may be limited to relatively simple geometric arrangements of microphones, for example, linear or circular arrays with no obstructions or objects that may absorb, reflect, or distort sound propagation. An auralizing system is implemented to generate multi-channel "auralized" sound signals based at least on impulse responses of the microphone array in an anechoic chamber and in a simulated room environment as well as other inputs.

As used herein, "auralization" refers to a process of rendering audio data by digital means to achieve a virtual three-dimensional sound space. Training a neural network with auralized multi-channel signals allows the neural network to capture the scattering effects of the multi-microphone array, other linear or non-linear effects, reverberation times in a room environment, as well as manufacturing variations between different microphones in the multi-microphone array. After being trained with data derived from the auralized multi-channel signals, a neural network may compute the complex coefficients, which may be used to estimate the direction or location of an actual sound source in a three-dimensional space with respect to a multi-microphone device. In some implementations, in addition to detecting the direction or location of the sound source, the neural network may also be trained and used as speech detector or a sound classifier to detect whether the received sound signal is or contains speech based on comparisons with a speech database, such as the TIMIT database.

In some implementations, sound signals from stationary or moving sound sources may be auralized, by an auralizing system, to generate auralized multi-channel sound signals. In some embodiments, the auralizer may obtain impulse responses of the multi-microphone array in a multi-microphone device, i.e., ARTFs or device related transfer functions, across a dense grid of three-dimensional coordinates, such as spherical coordinates, Cartesian coordinates, or cylindrical coordinates, and combine the ARTFs with responses from a room simulator and transfer functions indicative of microphone variations to generate auralized multi-channel sound signals, and signal labels related thereto, for example.

A signal label may include spatial information indicative of an estimated location of the sound source. For example, a label may include azimuth, elevation and distance in spherical coordinates if the sound source is stationary. Other types of three-dimensional coordinates such as Cartesian coordinates or cylindrical coordinates may also be used. If the sound source is moving, then a set of labels each corresponding to a given time frame may be provided. A neural network, for example, may be trained by receiving, processing, and learning from multiple sound features and their associated labels or sets of labels for stationary or moving sound sources to allow the sound detection system to estimate the locations of actual stationary or moving sound sources in a room environment.

FIG. 1 shows an example of a multi-microphone device 100, such as a video camera 16, including a plurality of microphones 10*a* and 10*b*, wherein the device 100 is arbitrarily shaped. As described above, the plurality of microphones 10*a* and 10*b*, the array of microphones, may not be arranged in a linear, circular, or other regular geometric pattern, and may be located anywhere in the arbitrary shape of the device. Although FIG. 2 illustrates an arbitrarily shaped video camera 16 with two microphones 10*a* and 10*b*, more than two microphones may be provided within the scope of the disclosure.

Figure 2:
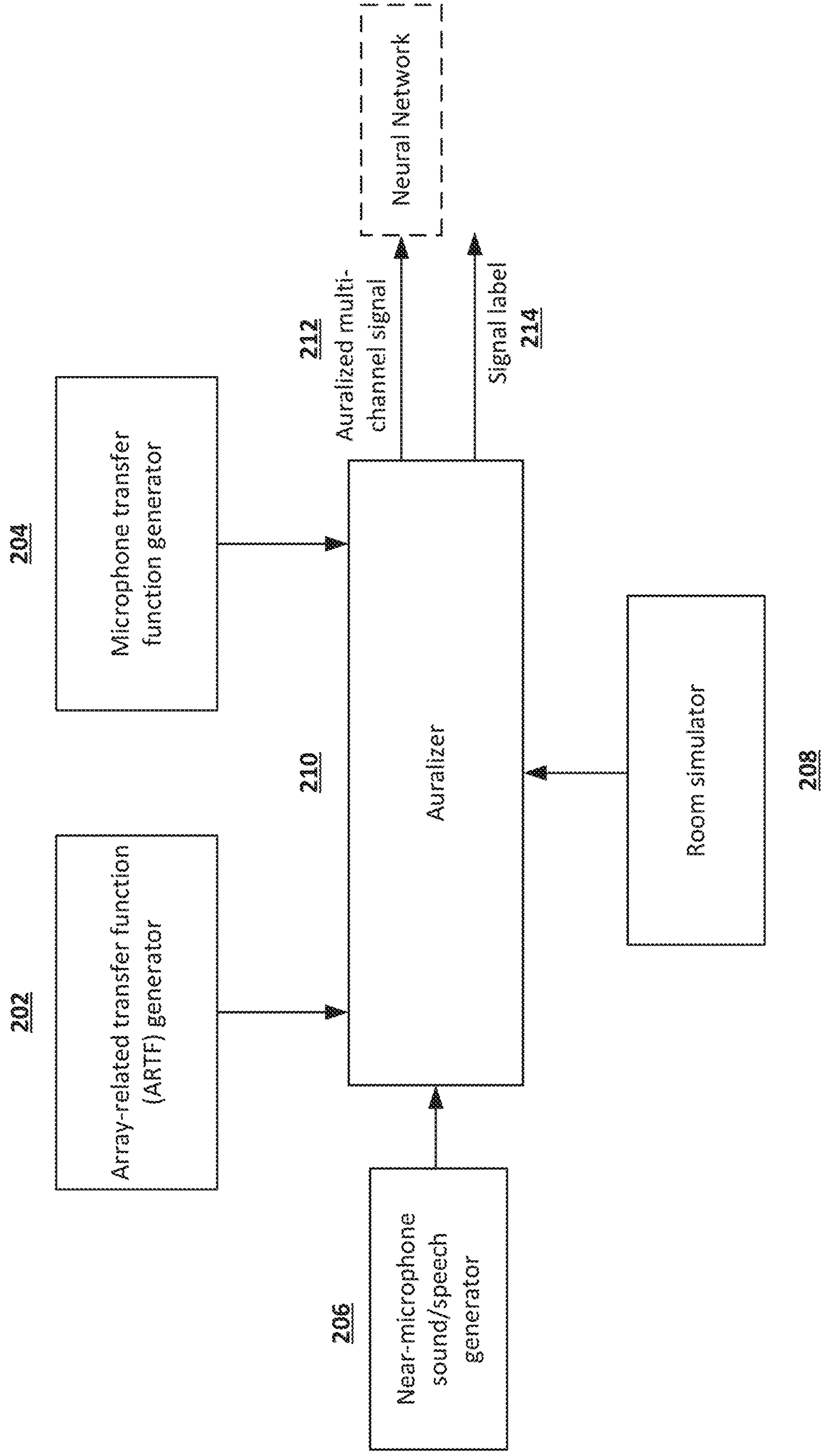
FIG. 2 shows an example of a system for generating auralized multi-channel signals and corresponding labels according to embodiments of the disclosed subject matter.

FIG. 2 shows an example of a system for generating auralized multi-channel signals and corresponding labels. In FIG. 2, an auralizer 210 has multiple inputs, including inputs from an ARTF generator 202, a microphone transfer function generator 204, a near-microphone sound/speech generator 206, and a room simulator 208. The ARTF generator 202 may be implemented to generate ARTFs (device-related transfer functions), which are anechoic impulse responses of the multi-microphone device in an anechoic chamber, and to store the ARTFs.

The ARTFs may be obtained across a dense grid of three-dimensional coordinates, which may be Cartesian coordinates, cylindrical coordinates, or spherical coordinates, in a three-dimensional space. The ARTF generator 202 obtains the ARTFs that have been measured in an anechoic chamber across a dense grid of distance, azimuth, and elevation. For a given distance, direction, and microphone number, the ARTF generator 202 generates the estimated ARTF by interpolating across the measured ARTFs;

$$A_{pm}(z)=\text{ARTF\_Interpolator}(\theta_{pm},d_{pm}).$$

The generated ARTFs are stored in a database (not shown) in the ARTF generator 202 for retrieval by the auralizer 210.

In some implementations, it is expected that individual microphones in a multi-microphone array may have different response characteristics. Even if the microphones in the multi-microphone array are of the same make and model, there may be slight differences in their response characteristics due to manufacturing variations, for example. A microphone transfer function generator (e.g., a microphone simulator) 204 may be implemented to generate microphone transfer functions, which take into account the response characteristics of individual microphones in the multi-microphone array. The microphone simulator 204 uses the gain and phase variations obtained from published datasheets, or from random sampling of microphones, to generate a random transfer function of a typical microphone; i.e., $$M_m(z)=\text{Microphone\_simulator}(m).$$

A near-microphone sound/speech generator 206 may be implemented to generate sounds or speeches to be transmitted to the auralizer 210. In some implementations, the near-microphone sound/speech generator 206 may generate reference sound signals for the auralizer 210. The near-microphone sound/speech may be a "clean" single-channel sound generated by a speech database, such as the TIMIT database which contains phonemically and lexically transcribed speeches of American English speakers of different genders and dialects. The generated near-microphone sound may be stored in a sound database (not shown) in the generator 206 for retrieval by the auralizer 210.

As shown in FIG. 2, a room simulator 208 is implemented to generate room impulse responses of the multi-microphone array by simulating an actual room environment. The room simulator eliminates the need for a multi-microphone device to be recorded in multiple rooms each time the design is modified or a microphone changed. Sound signals in an actual room environment may experience various effects including scattering effects, reverberations, reflections, refractions, absorptions, or other linear or nonlinear effects. In some implementations, the room simulator 208 may be implemented to generate room impulse responses that take into account the various effects of a simulated room environment, including scattering effects, reverberation times, or other linear or nonlinear effects. The room simulator 208 may be a computing device, such as a server, including a processor and a path information database (not shown). In some implementations, room impulse responses of the multi-microphone array may be obtained over the same dense grid of three-dimensional coordinates, which may be Cartesian coordinates, cylindrical coordinates or spherical coordinates, as the coordinates used for obtaining ARTFs or anechoic impulse responses generated by the ARTF generator 202.

The room simulator uses simulated room dimensions and the reflection coefficients of the walls and ceilings, thereof, and provides path information for the various sound paths (direct and reflective paths) to each microphone in the array, including the direction of arrival with respect to the microphone, and length of the total path, represented by:

$$[R_{pm}(z),\theta_{pm},d_{pm}]=\text{Room\_Simulator}(\text{dimension},\text{reflection\_coefficients},p,m);$$

where $R_{pm}(z)$, $\theta_{pm}$, and $d_{pm}$ are the transfer function, direction of arrival, and distance of the p th shortest path from the speaker to the m th microphone, respectively. The dimensions and reflected coefficients of the simulated room may be varied to simulate any room configuration that the multi-microphone device may be used in. The sound paths for each configuration are determined to generate the auralized multi-channel signal, which may be used to train a neural network, etc.

Figure 3:
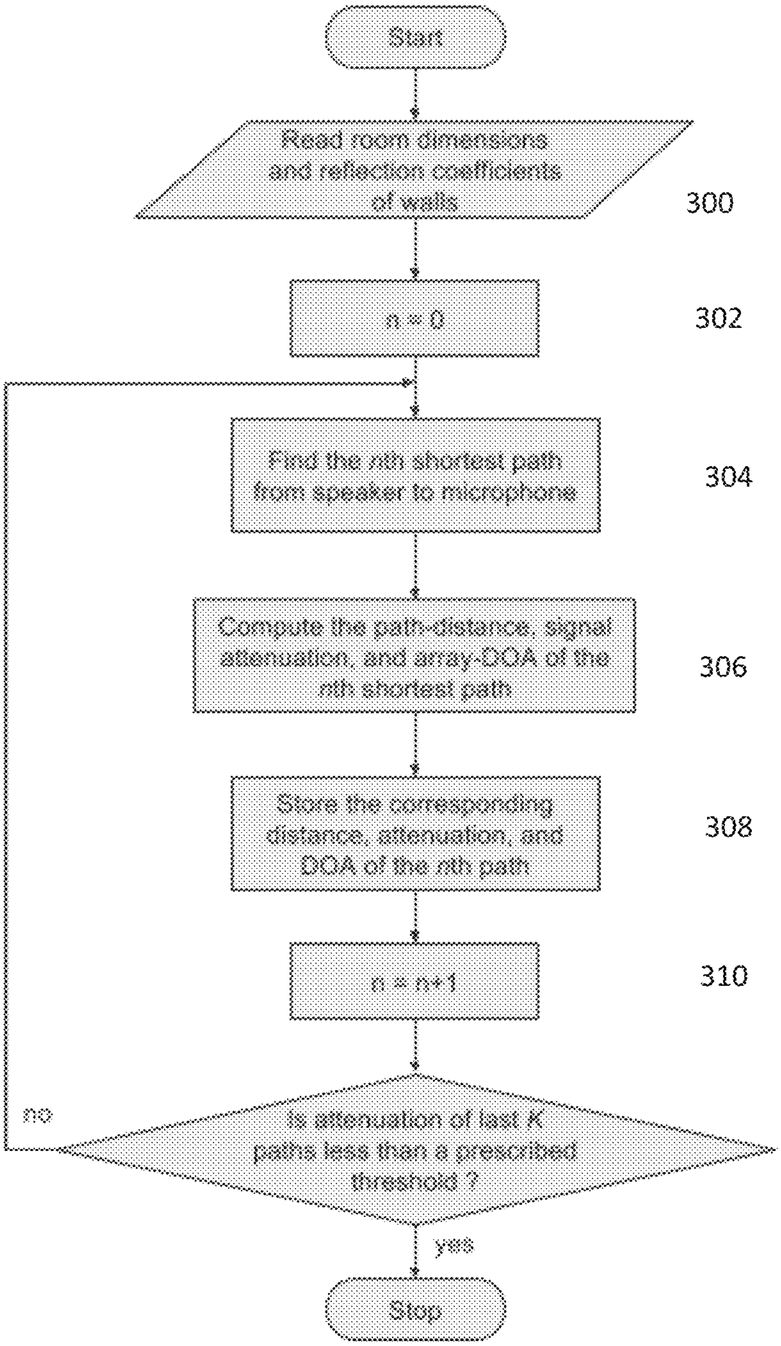
FIG. 3 shows an example flow diagram for computing sound paths according to embodiments of the disclosed subject matter.

FIG. 3 shows an example flow diagram of the method for generating the path information of the sound paths from the speaker to each microphone included in the device. This method may be performed by the room simulator. The room dimensions and reflection coefficients of walls of the simulated room(s) are retrieved by the room simulator (300). A path counter n is set to 0, representing the number of determined sound paths for a microphone (302). Using the retrieved room information, the n th shortest path from a speaker to each of the microphones included on the device is determined (304). Path information, including the path-distance, signal attenuation and array direction of arrival (DOA), is computed for the n th shortest path (306), and stored in a path information database by the simulator processor (308).

The path counter may be incremented by 1 (310). If the attenuation of the previous n paths is less than a threshold, the room simulator has generated the path information of the simulated room for each microphone included in the device, otherwise, the n th shortest path is determined (304).

The auralizer 210, including a processor, generates auralized multi-channel signals 212 and signal labels 214 corresponding to the auralized multi-channel signals 212 based on the inputs from the ARTF generator 202, the microphone transfer function generator 204, the near-microphone sound/speech generator 206, and the room simulator 208. The auralized path from a speaker to each microphone is obtained by combining the transfer function of the path from the room simulator 208 with that of the corresponding ARTF for each microphone, represented by $$\overline{R}_{pm}(z)=R_{pm}(z)A_{pm}(z)$$

where $\overline{R}_{pm}(z)$ is the auralized path. The overall auralized transfer function from the speaker to the respective microphone is obtained by combining all the paths to the microphone, i.e., $$H_m(z)=\sum_{p=0}^{P}\overline{R}_{pm}(z)$$

If x(n) is the signal from the speaker, the auralized signal ($y_m$) to the m th microphone, is represented by $$y_m(n)=h_m*x(n);$$

where $h_m$ is the impulse response of the transfer function $H_m(z)$. The auralized transfer function $H_m(z)$ may be modified to simulate only the initial reverberation, while the late reverberations can be simulated by a decaying random process, where the decay rate is dependent on the room reverberation characteristics, i.e., $$y_m(n)=h_m*x(n)+\sigma(n)v(n)$$

where σ(n) is the decaying function and v(n) is a white noise process with unit variance.

As shown in FIG. 2, the auralizer 210 may generate corresponding signal labels 214 in addition to the auralized multi-channel signals 212. A label may be provided for a corresponding feature extracted from a corresponding auralized multi-channel signal. In one implementation, a label for a corresponding feature may include spatial information on the sound source. For example, in spherical coordinates, the label for each corresponding signal feature may include the azimuth, elevation and distance of the sound source from a given microphone in the multi-microphone array. Other three-dimensional coordinates such as Cartesian coordinates or cylindrical coordinates may also be used.

Figure 4:
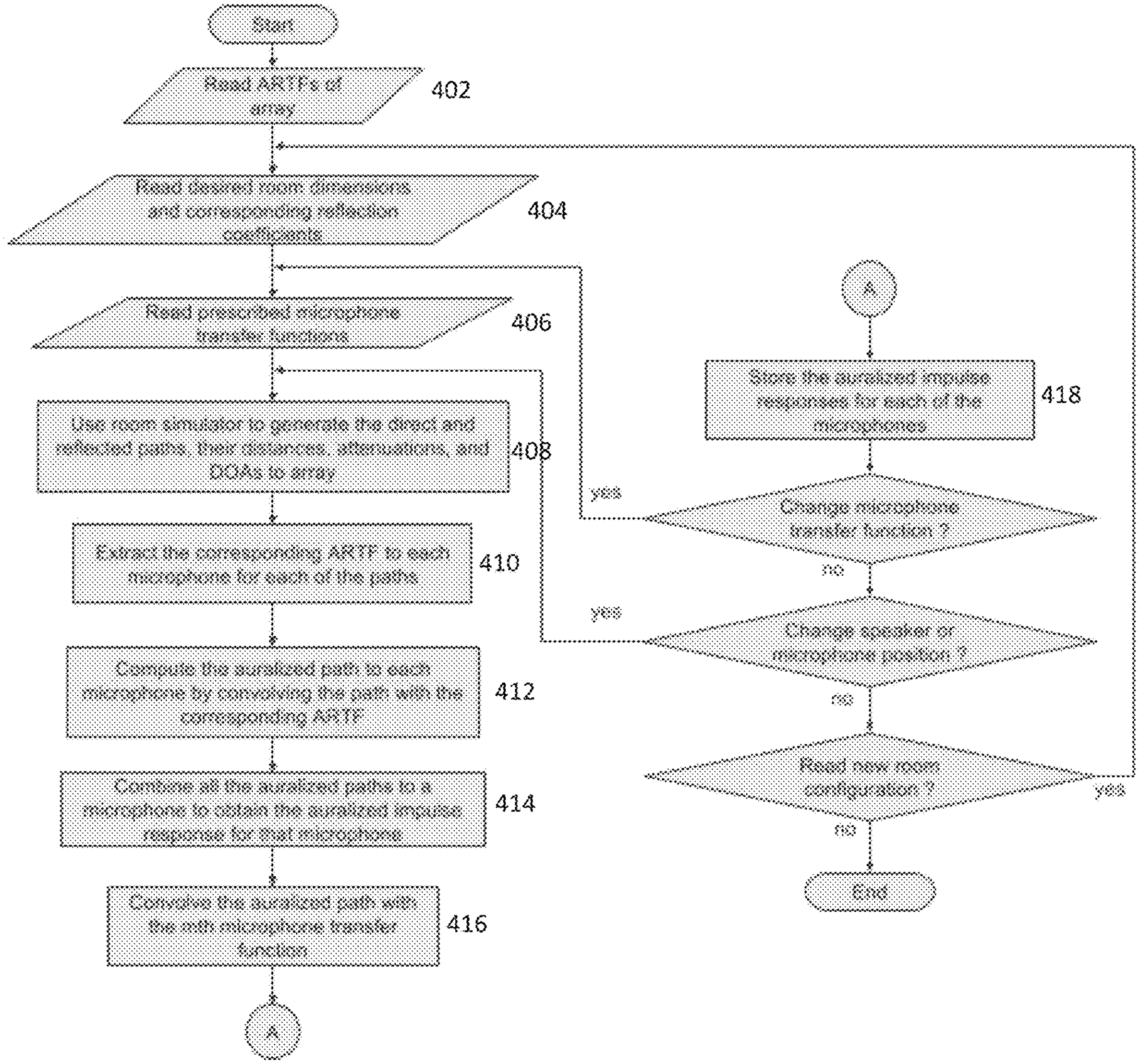
FIG. 4 shows an example flow diagram for generating the auralized impulse response according to embodiments of the disclosed subject matter.

FIG. 4 shows an example flow diagram for generating the auralized impulse response from the speaker to a microphone. The auralizer retrieves the ARTFs of the multi-microphone array of the device from the ARTF generator (402), obtains the desired room dimensions and corresponding reflection coefficients (404), and receives the prescribed microphone transfer functions from the microphone simulator (406). The room simulator generates the path information for each path for each microphone of the device (408) and extracts the corresponding ARTF to each microphone for each of the paths (410).

The auralizer may compute the auralized path for each microphone by convolving the path with the corresponding ARTF (412) and combine all of the auralized paths to a microphone to obtain the auralized impulse response for the respective microphone (414). The auralized path may then be convolved with the m th microphone transfer function (416) and the auralized impulse responses for each of the microphones (418).

As disclosed, in some embodiments the auralizer generates an auralized impulse response for each microphone for the simulated room dimensions and reflection coefficient, microphone transfer function, and position of the microphone in the simulated room. In some embodiments the auralizer determines an auralized impulse response for a plurality of different scenarios, where the simulated room configuration, the microphone transfer function, and/or the simulated room dimensions and reflection coefficients may change.

If the microphone transfer function is to be changed, the respective microphone transfer function is retrieved from the microphone simulator (406).

If the position of the speaker or microphone changes, the room simulator generates the path information for each path (408).

If the configuration of a new room is read, the desired room dimensions and reflection coefficients are obtained (404).

As disclosed herein, some embodiments may use the auralized multi-channel signals generated by the auralizing system to train a neural network, a sound classifier, and the like.

In some implementations, the auralizing system may generate auralized multi-channel signals from not only a stationary sound source but also a moving sound source. For example, a moving sound source may be a person who is talking and walking at the same time, or an animal that is barking and running at the same time. For a moving sound source, the ARTFs and the room impulse responses may be obtained across a dense grid of three-dimensional coordinates over time, and each ARTF and each room impulse response at a given point in space may vary as a function of time. In some implementations, the ARTFs and the room impulse responses may be regarded as having a fourth dimension (time) in addition to the three dimensions of space.

Figure 5:
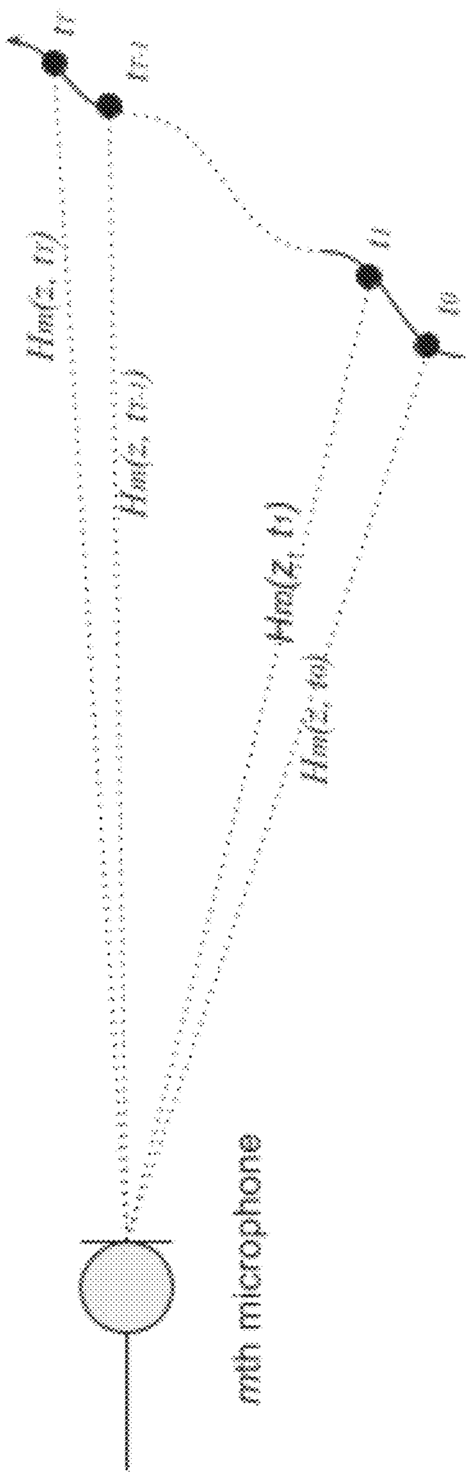
FIG. 5 shows an example illustration of a transfer function of a moving sound source according to embodiments of the disclosed subject matter.

FIG. 5 shows an illustration of the auralized transfer function of a moving sound source with respect to the m th microphone.

The distance and direction of a moving sound source with respect to the m th microphone can be expressed in parametric form d(t) and θ(t), respectively, where t is the time instant. Consequently, the auralized impulse response from the speaker to a microphone at time t is a function of the distance and direction, e.g., $H_m(z, d(t), \theta(t))$, or more concisely as $H_m(z, t)$.

Let $$h_{m,t_0}(n), h_{m,t_1}(n), \ldots, h_{m,t_T}(n)$$

be the known impulse responses of the auralized transfer functions $H_m(z, t_0)$, $H_m(z, t_1)$, . . . , $H_m(z, t_T)$, respectively. Then the impulse response at any time t, where 0<t<T, can be estimated by interpolating across the known impulses responses; i.e., $$h_{m,t}(n) = \text{Impulse\_response\_interpolator}(h_{m,t_0}(n), h_{m,t_1}(n), \ldots, h_{m,t_T}(n)),$$

Figure 6:
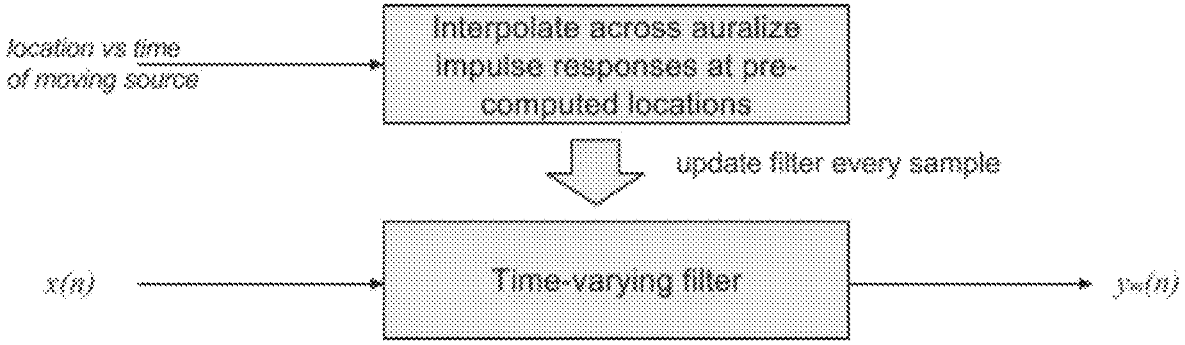
FIG. 6 shows an example block diagram of an implementation for auralizing a moving sound source.

Consequently, a moving sound source can be implemented as a time-varying impulse response where the variations are computed using the interpolator. If x(n) is the signal from the moving source, the auralized signal at m th microphone may be represented by:

$$y_m(n) = x(n) * h_{m,t}(n);$$

where $h_{m,t}(n)$ is a time-varying filter. FIG. 6 shows a block diagram of an implementation for auralizing a moving sound source.

Figure 7:
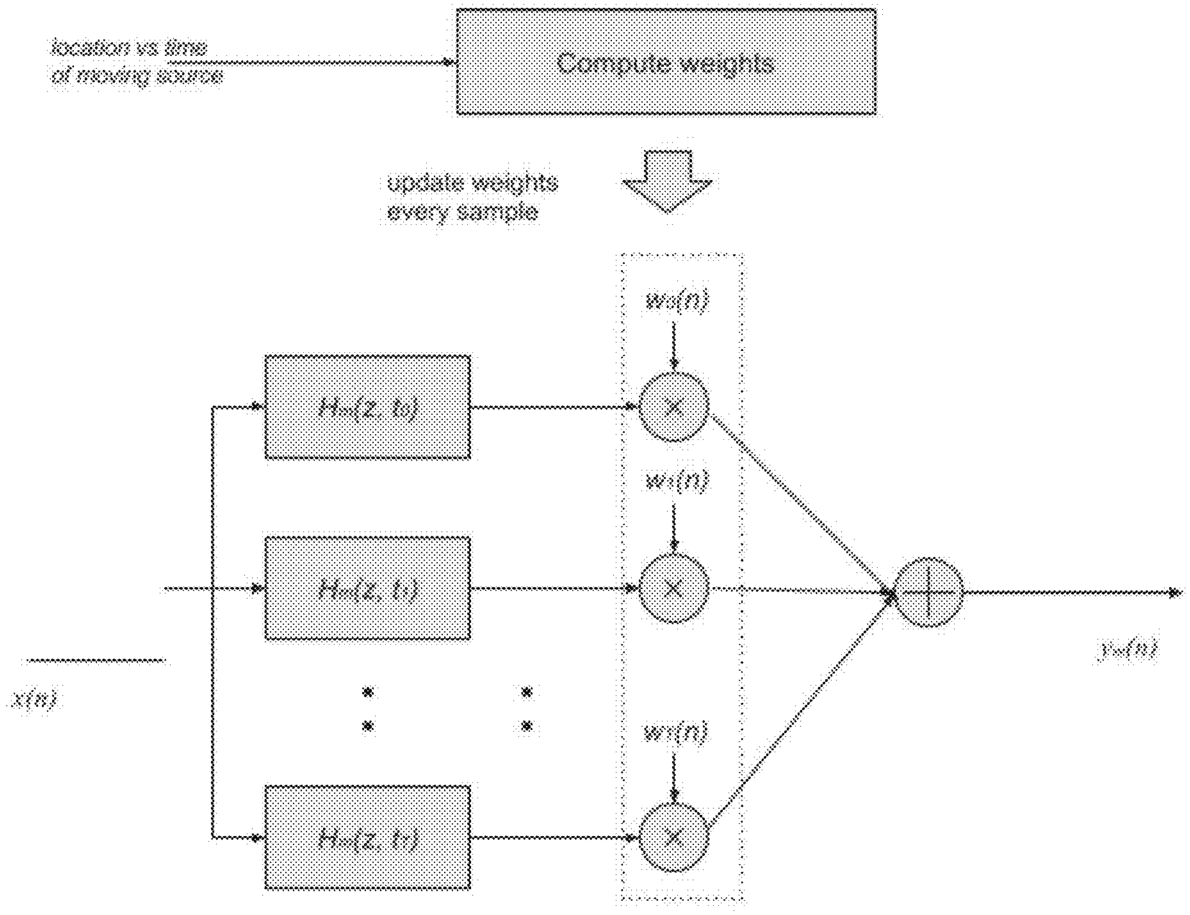
FIG. 7 shows an example block diagram of an implementation for auralizing a moving sound source.

In some embodiments, the output from each of the transfer functions $H_m(z, t_0)$, $H_m(z, t_1)$, . . . , $H_m(z, t_T)$ and an appropriately selected weighted combination of the output that varies over time is computed to auralize a moving sound source. If x(n) is the input to the transfer functions $H_m(z, t_0)$, $H_m(z, t_1)$, . . . , $H_m(z, t_T)$ and $y_{t_0}(n)$, $y_{t_1}(n)$, . . . , $y_{t_T}(n)$ are the corresponding outputs, the auralized signal, $y_m(n)$, at the m th microphone can be computed by utilizing time-varying weights; i.e., $$y_m(n) = w_0(t) y_{t_0}(n) + w_1(t) y_{t_1}(n) + \ldots w_T(t) y_{t_T}(n);$$

where $w_0(t) + w_1(t) + \ldots + w_T(t) = 1$. By appropriately varying the weights $w_0(t)$, $w_1(t)$, . . . $w_T(t)$, a moving source can be simulated. A block diagram of an implementation is shown in FIG. 7.

Figure 8:
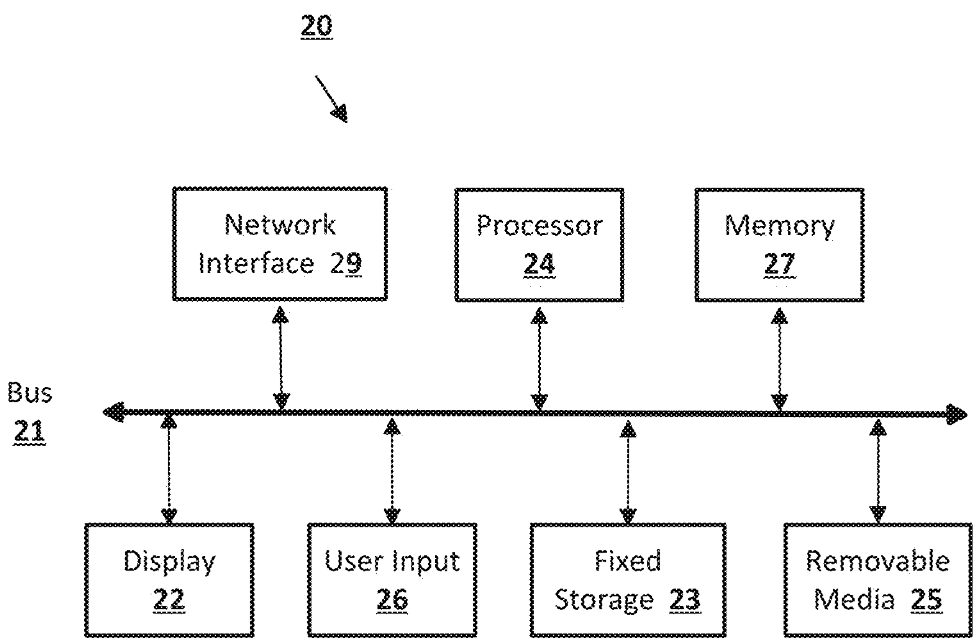
FIG. 8 shows an example of a computing device according to embodiments of the disclosed subject matter.

Embodiments of the presently disclosed subject matter may be implemented in and used with a variety of component and network architectures. For example, the system for auralizing multi-channel signal for a multi-microphone device as shown in FIG. 2 may include one or more computing devices for implementing embodiments of the subject matter described above. FIG. 8 shows an example of a computing device 20 suitable for implementing embodiments of the presently disclosed subject matter. The device 20 may be, for example, a desktop, laptop computer, server, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 8 need not be present to practice the present disclosure. The components can be interconnected in different ways from that shown. The operation of a computer such as that shown in FIG. 8 readily known in the art and is not discussed in detail in this application. Code to implement the present disclosure can be stored in computer-readable storage media such as one or more of the memory 27, fixed storage 23, removable media 25, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor or an Application Specific Integrated Circuit (ASIC) that embodies all or part of the techniques according to embodiments of the disclosed subject matter in hardware or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

In some embodiments, the multi-microphone device 100 as shown in FIG. 1 may be implemented as part of a network of sensors. These sensors may include microphones for sound detection, for example, and may also include other types of sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, or other sensors. Such a housing also may be referred to as a sensor or a sensor device. For clarity, sensors are described with respect to the particular functions they perform or the particular physical hardware used, when such specification is necessary for understanding of the embodiments disclosed herein.

Figure 9:
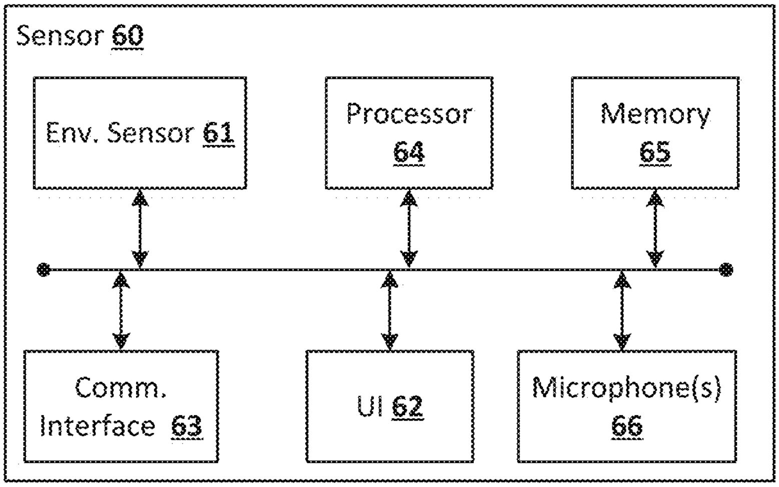
FIG. 9 shows an example of a sensor according to embodiments of the disclosed subject matter.

A sensor may include hardware in addition to the specific physical sensor that obtains information about the environment. FIG. 9 shows an example of a sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. Furthermore, the sensor 60 may include one or more microphones 66 to detect sounds in the environment. One or more components may be implemented in a single physical arrangement, such as where multiple components are implemented on a single integrated circuit. Sensors as disclosed herein may include other components, or may not include all of the illustrative components shown.

Sensors as disclosed herein may operate within a communication network, such as a conventional wireless network, or a sensor-specific network through which sensors may communicate with one another or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Moreover, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment, in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services or communication protocols.

A smart-home environment may include communication with devices outside of the smart-home environment but within a proximate geographical range of the home. For example, the smart-home environment may communicate information through the communication network or directly to a central server or cloud-computing system regarding detected movement or presence of people, animals, and any other objects and receives back commands for controlling the lighting accordingly.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method of generating an impulse response from a speaker to a first microphone of a plurality of microphones of a multi-microphone device via one or more sound paths, the method comprising:

determining a plurality of sound paths to the first microphone of the plurality of microphones, wherein the plurality of sounds paths includes at least a first sound path and a second sound path;

generating a first auralized path for the first sound path to the first microphone and a second auralized path for the second sound path to the first microphone based on room simulator information, wherein the room simulator information is generated based on the first sound path to the first microphone by determining n-th shortest sound paths from the speaker to the first microphone, wherein n is a counter of sound paths that have been determined; and combining the first auralized path for the first sound path to the first microphone with the second auralized path for the second sound path to the first microphone to generate an auralized transfer function for the first microphone.

2. The method of claim 1, further comprising retrieving characteristic information based on the first sound path of the plurality of sound paths to the first microphone, wherein the first auralized path for the first sound path to the first microphone and the second auralized path for the second sound path to the first microphone are generated based on the characteristic information and the room simulator information.

3. The method of claim 2, wherein the first auralized path is generated by convolving the characteristic information and the room simulator information.

4. The method of claim 1, further comprising retrieving a microphone transfer function for the first microphone.

5. The method of claim 4, further comprising combining the first auralized path with the microphone transfer function for the first microphone.

6. The method of claim 5, wherein the first auralized path is combined with the microphone transfer function for the first microphone by convolving the first auralized path with the microphone transfer function.

7. The method of claim 1, wherein generating the room simulator information is further based on generating a path transfer function.

8. The method of claim 1, wherein generating the room simulator information is further based on reflection coefficients of a simulated room.

9. The method of claim 1, wherein generating the room simulator information is further based on dimensions of a simulated room.

10. The method of claim 1, wherein the room simulator information includes a path-distance, signal attenuation, or direction of arrival.

11. The method of claim 1, further comprising generating an additional impulse response for each other microphone of the plurality of microphones of the multi-microphone device.

12. The method of claim 1, further comprising generating a multi-channel sound signal.

13. The method of claim 1, wherein the impulse response varies as a function of time.

14. The method of claim 1, further comprising computing a path-distance, signal attenuation, or direction of arrival for the determined n-th shortest sound path.

15. The method of claim 14, further comprising incrementing the counter and determining a next n-th shortest sound path when n sound path attenuation is not less than a threshold value.

16. A system for generating an impulse response from a speaker to a first microphone of a plurality of microphones of a multi-microphone device via one or more sound paths, the system comprising:

an auralizer including a processor that is configured to:

determine a plurality of sound paths to the first microphone of the plurality of microphones, wherein the plurality of sounds paths includes at least a first sound path and a second sound path;

generate a first auralized path for the first sound path to the first microphone and a second auralized path for the second sound path to the first microphone based on room simulator information, wherein the room simulator information is generated based on the first sound path to the first microphone by determining n-th shortest sound paths from the speaker to the first microphone, wherein n is a counter of sound paths that have been determined; and combine the first auralized path for the first sound path to the first microphone with the second auralized path for the second sound path to the first microphone to generate an auralized transfer function for the first microphone.

17. The system of claim 16, further comprising a room simulator that is configured to generate the room simulator information based on the first sound path to the first microphone.

18. The system of claim 16, further comprising a microphone transfer function generator that is configured to generate a microphone transfer function for the first microphone, wherein the first auralized path is combined with the microphone transfer function for the first microphone by convolving the first auralized path with the microphone transfer function.

* * * * *